(12) United States Patent  
Suda

(10) Patent No.: US 7,505,475 B2
(45) Date of Patent: Mar. 17, 2009

(54) MULTIPLE ACCESS COMMUNICATION SYSTEM AND DATA TRANSCEIVER

(75) Inventor: Yukinori Suda, Tokyo (JP)

(73) Assignee: NEC Corporation, Tokyo (JP)

( * ) Notice: Subject to any disclaimer, the term of this patent is extended or adjusted under 35 U.S.C. 154(b) by 331 days.

(21) Appl. No.: 11/455,194

(22) Filed: Jun. 19, 2006

(65) Prior Publication Data

US 2006/0233151 A1  Oct. 19, 2006

Related U.S. Application Data

(62) Division of application No. 10/082,087, filed on Feb. 26, 2002, now Pat. No. 7,103,012.

(30) Foreign Application Priority Data

Feb. 27, 2001  (JP) .............................. 2001-052288

(51) Int. Cl.
*H04L 12/56* (2006.01)
*H04B 7/212* (2006.01)

(52) U.S. Cl. ....................... 370/412; 370/419
(58) Field of Classification Search ......... 370/412–418, 370/419, 328, 329; 712/300
See application file for complete search history.

(56) References Cited

U.S. PATENT DOCUMENTS

| 5,265,207 | A | * | 11/1993 | Zak et al. ...................... 712/15 |
| 5,970,062 | A | | 10/1999 | Bauchot |
| 6,477,370 | B1 | | 11/2002 | Sigler et al. |
| 2004/0221143 | A1 | * | 11/2004 | Wise et al. ................... 712/300 |

FOREIGN PATENT DOCUMENTS

JP   61-33054   2/1986

* cited by examiner

*Primary Examiner*—John Pezzlo
(74) *Attorney, Agent, or Firm*—McGinn IP Law Group, PLLC

(57) ABSTRACT

A multiple access communications system achieving an improvement in transmission efficiency is disclosed. A slave station receives data from variable speed data terminals and generates a plurality of data packets. The slave station then transmits a transmission request packet containing a total amount of data packets to be concatenated to a master station. The master station transmits a transmission permission packet containing a total amount of data packets permitted to be concatenated through a broadcast line to the slave station. The slave station concatenates a plurality of uplink transmission data packets within a predetermined range, and transmits a concatenated uplink transmission data packet to the master station through the multiple access line network.

6 Claims, 14 Drawing Sheets

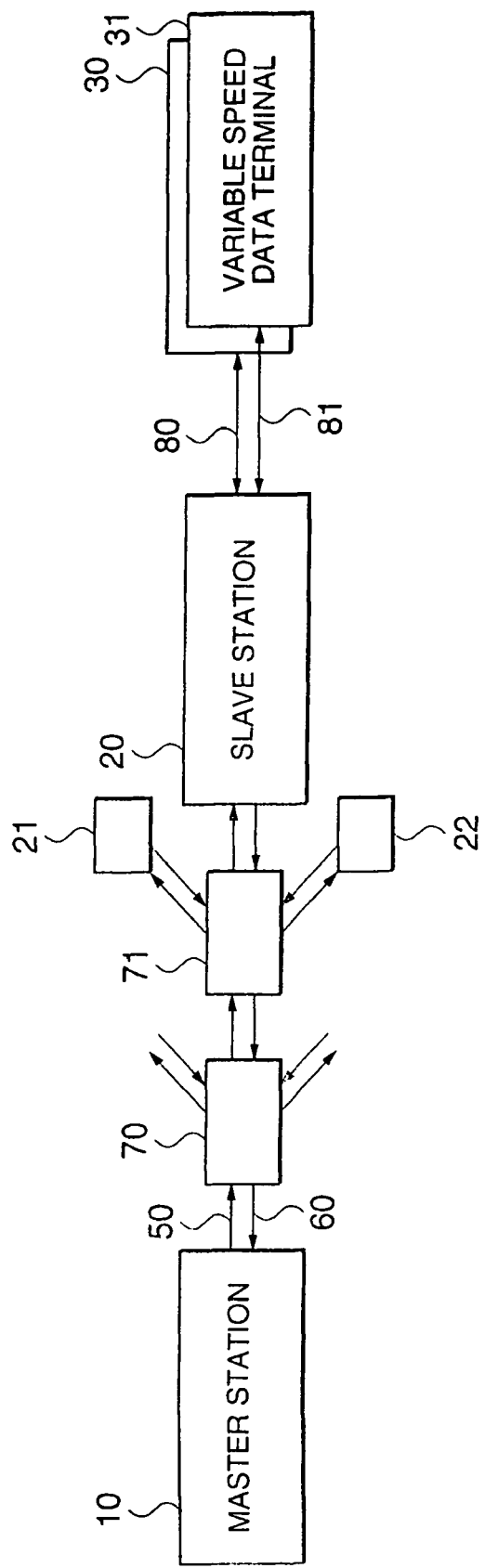

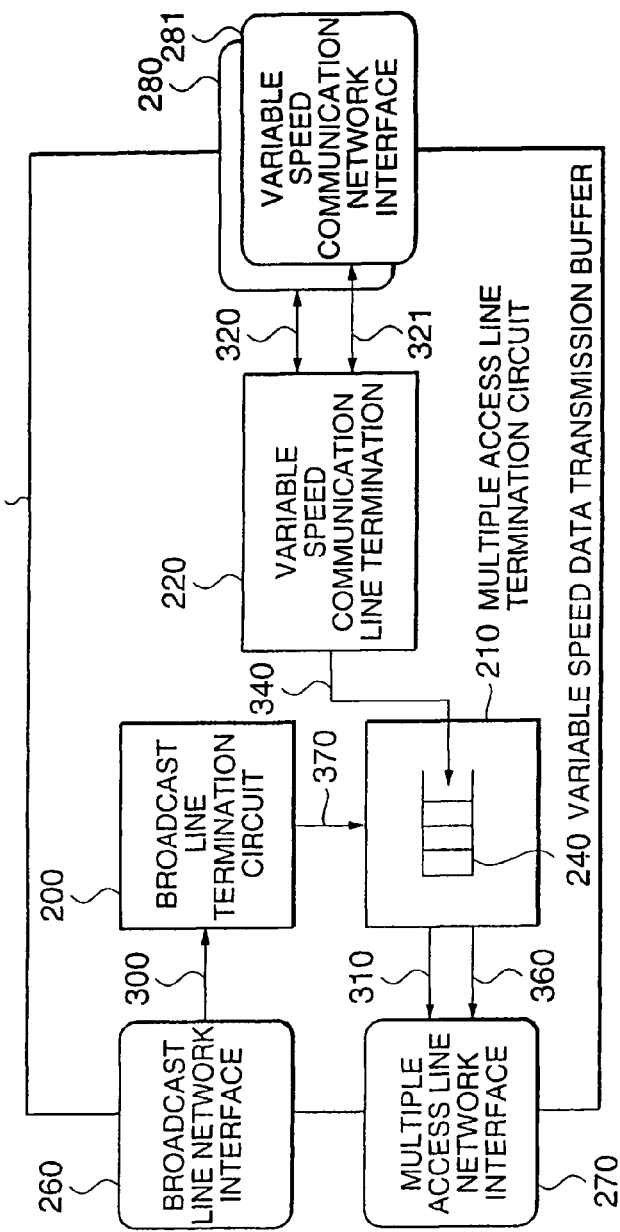

FIG.7

NUMBER OF DATA 600

DATA SIZE

| | H |
|---|---|
| ~64 | 10 |
| 65~100 | 10 |
| 101~200 | 10 |
| ⋮ | ⋮ |
| 1301~1400 | 10 |
| 1401~1500 | 10 |
| 1501~ | 10 |

OVERHEAD Hsum CORRESPONDENCE TABLE
(FOR INDIVIDUAL TRANSMISSION)

FIG.8

NUMBER OF DATA 700

DATA SIZE

| | 1 | 2 | 3 | ⋯ | 9 | 10 |
|---|---|---|---|---|---|---|
| ~64 | 15 | 15 | 15 | ⋯ | 15 | 15 |
| 65~100 | 16 | 16 | 16 | ⋯ | 16 | 16 |
| 101~200 | 17 | 17 | 17 | ⋯ | 17 | 17 |
| ⋮ | ⋮ | ⋮ | ⋮ | ⋮ | ⋮ | ⋮ |
| 1301~1400 | 28 | 28 | 28 | ⋯ | 28 | 28 |
| 1401~1500 | 29 | 29 | 29 | ⋯ | 29 | 29 |
| 1501~ | 30 | 30 | 30 | ⋯ | 30 | 30 |

OVERHEAD Hsum CORRESPONDENCE TABLE
(FOR CONCANATED TRANSMISSION)

MULTIPLE ACCESS COMMUNICATION SYSTEM AND DATA TRANSCEIVER

The present Application is a Divisional Application of U.S. patent application Ser. No. 10/082,087 filed on Feb. 26, 2002 now U.S. Pat. 7,103,012.

BACKGROUND OF THE INVENTION

1. Technical Field

The present invention relates to a multiple access communication system and a data transceiver used in a broadband access network or the like.

2. Related Art

Broadband access networks such as cable modems using cable television lines or Fixed Wireless Access (FWA) using fixed radio channels have been provided even in ordinary households to implement high speed internet access. Cable modems and FWA are described in detail in, for example, Nikkei Communication, No. 316, April 2000. These broadband access networks nearly all use multiple access lines where a number of users share the same frequency band as an uplink, in order to reduce costs. With multiple access type lines, each slave station is connected to a master station through shared media for sharing the same frequency band with other slave stations, and a transmission order between slave stations is controlled by master station multiple access control.

In order to synchronize time between the master station and all of the slave stations, the master station distributes a time synchronization packet via a broadcast channel. In this type of multiple access communication system, in order to use the uplink efficiently, each slave station concatenates a plurality of uplink transmission data packets to transmit them. Also, the slave stations separately manage transmission data itself and state information representing the state of the transmission data. When a slave station sets a control flag within the state information to unchangeable, a MAC (media access control) controller automatically transmits a corresponding transmission data body to the uplink. When concatenating and transmitting, the slave station sets a concatenated transmission flag in the state information, and the MAC controller consecutively concatenates all transmission data bodies having a concatenated transmission flag set and automatically transmits them to the uplink.

When transmitting communication data, a conventional multiple access communications system adds additional information to the communication data to be transmitted. In the case of concatenating a plurality of transmission data, additional information for indicating that there is concatenated data is further added for transmission. By doing this, if the size of the additional information becomes large compared to the size of the transmission data, the concatenating of a plurality of transmission data for transmission suffers from a first problem that conversely the utilization rate of the multiple access lines is degraded.

Also, when a slave station concatenates and transmits a plurality of transmission data, the uplink is occupied for a long period of time so there is a second problem that the length of time that other slave stations must wait until transmitting transmission data is increased.

According to a conventional multiple access communication system, generation of transmission data and transmission to the multiple access line is asynchronous. Accordingly, there is developed a third problem that a delay in transmission data, which is required in real time, is increased.

Since transmit packets in a transmission buffer are transmitted automatically one by one, in order to concatenate and transmit transmission data there is a fourth problem that it is necessary to have completed concatenating processing by the time transmission data is put into the transmission buffer.

The uplink control information and uplink user data make shared use of the same transmission buffer, and a slave station sequentially performs transmission from header transmission data in the transmission buffer. Accordingly, there is a fifth problem that the uplink control information is not given priority over the uplink user data when performing transmission.

In the case of concatenating a plurality of packets having a fixed information length, Japanese Patent Application Unexamined Publication No. 61-33054 discloses a packet transmitting/receiving system where a start block is added to the leading end of the concatenated packets and an end block is added to the trailing end thereof. However, this prior art is applicable to a fixed-length packet transmitting/receiving system.

SUMMARY OF THE INVENTION

The present invention has been conceived in view of the above described situation, and a first object of the present invention is to provide a multiple access communication system and a data transceiver allowing always highly efficient utilization rates for multiple access lines.

A second object of the present invention is to provide a multiple access communication system and a data transceiver avoiding an uplink to be occupied by a single slave station for a long period of time.

A third object of the present invention is to provide a multiple access communication system and a data transceiver allowing reduced delay of transmission data that is required in real time.

A fourth object of the invention is to provide a multiple access communication system and a data transceiver allowing all transmission data satisfying concatenated transmission conditions to be concatenated and transmitted.

A fifth object of the present invention is to provide a multiple access communication system and a data transceiver allowing uplink control information to be transmitted with priority over uplink user data.

In order to achieve the above described objects, a first aspect of the present invention is a multiple access communications system including: a master station; and a plurality of slave stations, each of which is connected to the master station using an uplink and a downlink and is connected to at least one terminal. Each of the slave stations includes: a transmission buffer for storing data received from a terminal as uplink transmission packets; a condition memory storing a transmission condition for packet concatenation; a packet concatenation section for concatenating a plurality of uplink transmission packets stored in the transmission buffer within a range satisfying the transmission condition, to produce a concatenated uplink transmission packet; and a transmitter for transmitting the concatenated uplink transmission packet to the master station.

The packet concatenation section may concatenate a plurality of uplink transmission packets within an upper limit to number of uplink transmission packets determined by the transmission condition. The packet assembler may concatenate a plurality of uplink transmission packets within an upper limit to a total amount of uplink transmission packets determined by the transmission condition.

The transmission condition may be previously set such that concatenating of the plurality of uplink transmission packets is performed only when a total amount of first additional information that would be added if the uplink transmission packets are individually transmitted is not smaller than an amount of second additional information that would be added if the concatenated uplink transmission packet is transmitted, wherein the packet concatenation section concatenates the plurality of uplink transmission packets when the transmission condition is satisfied.

The slave station may further include a table memory storing a table containing correspondence between a packet data size and an amount of additional information to be added when individually transmitted, wherein the table is used to determine whether the total amount of first additional information is not smaller than the amount of second additional information.

The slave station may further include a table memory storing a table containing correspondence between a packet data size, a number of packets to be concatenated, an amount of additional information to be added when concatenated, and wherein the table is used to determine whether the total amount of first additional information is not smaller than the amount of second additional information.

According to another aspect of the present invention, a multiple access communications system includes: a master station; and a plurality of slave stations, each of which is connected to the master station using an uplink and a downlink and is connected to at least one fixed speed data terminal. The master station includes a time synchronization packet transmitter for transmitting a time synchronization packet to the slave stations to obtain time synchronization with the slave stations, and each of the slave stations includes: a converter for converting all fixed speed data received from the at least one fixed speed data terminal to uplink transmission data packets in synchronization with the time synchronization packet, and a transmitter for starting transmission processing of the uplink transmission data packets when the fixed speed data from all of the at least one fixed speed data terminal have been stored.

Each of the slave stations may further include: a detector for detecting at least one fixed speed data terminal that is in an active state, wherein the transmitter starts the transmission processing of the uplink transmission data packets when the fixed speed data from all of the at least one fixed speed data terminal that is in the active state has been stored.

The master station may periodically transmit a transmission permission packet to the slave stations, wherein the converter converts the fixed speed data to uplink transmission data packets in synchronism with the transmission permission packet, and the transmitter performs transmission of the uplink transmission data packets according to timing designated by the transmission permission packet.

According to further another aspect of the present invention, a multiple access communications system includes: a master station; and a plurality of slave stations, each of which is connected to the master station using an uplink and a downlink and is connected to at least one terminal, wherein each of the slave stations transmits an uplink data packet and an uplink control information packet to the master station as an uplink transmission data packet. Each of the slave station includes a first buffer for storing uplink transmission data packets; a second buffer for storing uplink transmission data packet status information indicating a status of each of the uplink transmission data packets; and a buffer controller controlling such that, when an uplink transmission data packet is stored in the first buffer, a control flag is set to not-changeable and is added to uplink transmission data packet status information corresponding to the uplink transmission data packet, and the uplink transmission data packet status information with the control flag set to not-changeable is stored in the second buffer.

The buffer controller may previously set an upper limit to a number of uplink transmission data packets to be set to not-changeable, wherein, when a number of uplink transmission data packets exceeds the upper limit, the buffer controller sets the control flag to changeable and adds it to uplink transmission data packet status information corresponding to uplink transmission data packets exceeding the upper limit, to store the uplink transmission data packet status information with the control flag set to changeable in the second buffer.

Each of the slave stations may further include a condition memory storing a transmission condition, wherein, when a number of uplink transmission data packets set to not-changeable falls below the upper limit, the buffer controller determines whether the uplink transmission data packets set to changeable stored in the first buffer satisfy the transmission condition, and when the uplink transmission data packets set to changeable satisfy the transmission condition, the buffer controller sets a control flag of uplink transmission data packet status information corresponding to each of the uplink transmission data packets set to changeable to not-changeable, and concatenates the uplink transmission data packets set to changeable in sequence to produce a concatenated uplink transmission packet for transmission to the master station.

The buffer controller may controls such that, when the uplink control information packet is stored in the first buffer, the uplink control information packet is stored at a location of the first buffer immediately before the uplink transmission data packets set to not-changeable stored in the first buffer.

According to the present invention, a data transceiver connected between a master station and at least one terminal to transfer data between the master station and the at least one terminal, includes: a transmission buffer for storing data received from a terminal as uplink transmission packets; a condition memory storing a transmission condition; a packet concatenation section for concatenating a plurality of uplink transmission packets stored in the transmission buffer within a range satisfying the transmission condition, to produce a concatenated uplink transmission packet; and a transmitter for transmitting the concatenated uplink transmission packet to the master station.

According to the present invention, a data transceiver connected between a master station and at least one fixed speed data terminal to transfer data between the master station and the at least one terminal, includes: a packet data generator for generating uplink transmission data packets from fixed speed data received from the at least one fixed speed data terminal, in synchronization with a time synchronization packet received from the master station to; and a data packet transmitter for performing transmission processing of the uplink transmission data packets when the fixed speed data from all of the at least one fixed speed data terminal have been received.

According to the present invention, a data transceiver connected between a master station and at least one terminal to transfer data between the master station and the at least one terminal, includes: a first buffer for storing uplink transmission data packets; a second buffer for storing uplink transmission data packet status information indicating a status of each of the uplink transmission data packets; and a buffer controller controlling such that, when an uplink transmission data packet is stored in the first buffer, a control flag is set to not-changeable and is added to uplink transmission data packet status information corresponding to the uplink transmission data packet, and the uplink transmission data packet status information with the control flag set to not-changeable is stored in the second buffer.

According to the present invention, a multiple access communication method between a master station and a plurality of slave stations, each of which is connected to the master station using an uplink and a downlink and is connected to at least one terminal, includes the steps of: at a slave stations, generating a plurality of data packets from data received from the at least one terminal; transmitting a transmission request packet containing a total amount of data packets to be concatenated to the master station; at the master station, in response to the transmission request packet, transmitting a transmission permission packet containing a total amount of data packets permitted to be concatenated to the slave station; at the slave station, concatenating a plurality of uplink transmission data packets within a predetermined range to produce a concatenated uplink transmission data packet; and transmitting the concatenated uplink transmission data packet to the master station.

BRIEF DESCRIPTION OF THE DRAWINGS

FIG. 1 is a schematic diagram showing a multiple access communication system employed for explanation of first to sixth, ninth and tenth embodiments of the present invention.

FIG. 2 is a block diagram of a slave station of first, second, third and fourth embodiments of the present invention.

FIG. 3 is a diagram showing an example of the format of an uplink transmission data packet of the first embodiment of the present invention.

FIG. 7 is a table regarding size of data packets held in a storage circuit 380 of FIG. 6 in the fourth embodiment of the present embodiment.

FIG. 8 is a table regarding number and size of data packets to be concatenated held in the storage circuit 380 of the fifth embodiment of the present invention in FIG. 6.

DETAILED DESCRIPTION OF THE PREFERRED EMBODIMENTS

First Embodiment

Figure 4:
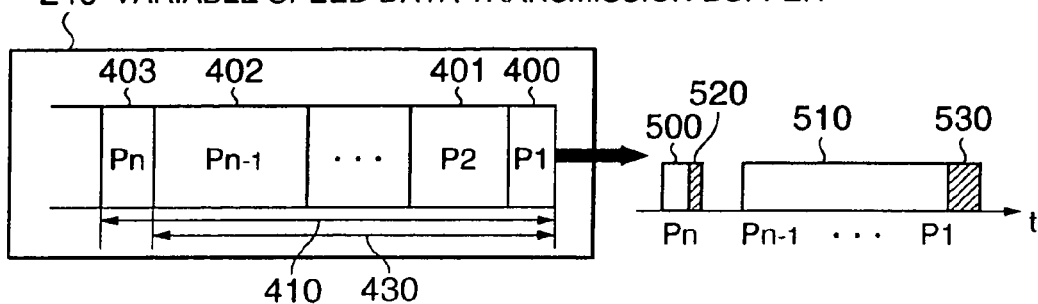
FIG. 4 is a diagram showing an example of the format of an uplink transmission data packet of the second embodiment of the present invention.

A first embodiment of the present invention will be described in the following, with reference to the drawings.

FIG. 1 is a block diagram showing a multiple access communication system of this embodiment. In this drawing, a plurality of slave stations 20, 21 and 23 receive data and control information from a master station 10 through a broadcast line 50. The master station 10 receives data packets and control information packets from the plurality of slave stations through a multiple access line 60. Also, the slave station 20 is connected to a variable speed data terminals 30 and 31 through variable speed communication lines 80 and 81 respectively.

FIG. 2 is a block diagram showing the above-described slave station in detail. A broadcast line termination circuit 200 receives data from the master station, while a multiple access line termination circuit 210 transmits data to the master station. A variable speed communication line termination circuit 220 transmits and receives data to and from the variable speed communication terminal, and a variable speed data transmission buffer 240 holds uplink transmission data from the variable speed communication terminals. A broadcast line network interface 260 receives downlink transmission data packets from the master station 10, and a multiple access line network interface 270 receives uplink transmission data packets from the slave station 20. Variable speed communication network interfaces 280 and 281 perform data communication with the variable speed communication terminals.

Next, an operation of the first embodiment will be described. In FIG. 1 and FIG. 2, when the variable speed communications terminals 30 and 31 transmit data, the variable speed communication network interfaces 280 and 281 receive this data, and this data is held in the variable speed data transmission buffer 240 through the variable speed communication line termination circuit 220. At this time, the multiple access line termination circuit 210 references a transmission condition for packet concatenation being held internally. Only when this transmission condition is satisfied, the slave station 20 produces a transmission request packet 360 having its own station number and a total data size included therein, and transmits it to the master station 10 through the multiple access line network 60. When having received the transmission request packet 360 from the slave station 20, the master station 10 produces a transmission permission packet 300 having the number of the slave station 20 and a data size approved for transmission included therein and transmits this signal to the slave station 20 via the broadcast line 50. The slave station 20 receives the transmission permission packet 300 at the broadcast line termination circuit 200 through the broadcast line network interface 260. Then, the broadcast line termination circuit 200 sends a transmission instruction signal 370 containing data size information approved for transmission to the multiple access line termination circuit 210. The multiple access line termination circuit 210, when having received the transmission instruction signal 370, extracts a plurality of transmission data appropriate for the designated data size from the variable speed data transmission buffer 240, concatenates the plurality of data within a predetermined range and adds an overhead such as concatenated header information containing information used for separation at the receive side and physical layer header information such as Forward Error Correction (FEC). After that, the data is sent via the multiple access line network interface 270 and the multiple access line 60 to the master station 10 as an uplink transmission data signal 310.

FIG. 3 is an example of the format of the uplink transmission data packet signal 310. When transmission data packets 400, 401, 402 and 403 of P1, P2, . . . Pn-1, Pn are held in the variable speed data transmission buffer 240 of the slave station 20, the multiple access line termination circuit 210 reads out an internally held transmission condition. When the transmission condition sets an upper limit to the number of concatenated transmission packets, the multiple access line termination circuit 210 performs concatenating for a number of concatenated data packets 440 that is only a number of data packets that does not exceed the upper limit set by the transmission condition. The multiple access line termination circuit 210 adds a concatenated transmission overhead 530 to the concatenated transmission data packets 510 and then transmits a resultant signal to the master station 10 via the multiple access line network 60.

Here, assuming that the upper limit to the number of concatenated data packets is twenty and twenty-five transmission data packets are held in the variable speed data transmission buffer 240, twenty ones of the twenty-five transmission data packets are concatenated, a concatenated transmission data packet 510 is generated, a concatenated transmission overhead 530 is added and transmission is performed.

Second Embodiment

Next, a second embodiment of the present invention will be described with reference to FIG. 1, FIG. 2 and FIG. 4.

FIG. 4 is an example of the format of an uplink transmission data packet according to the second embodiment. When uplink transmission data packets P1, P2, . . . Pn-1, Pn are held in the variable speed data transmission buffer 240, the multiple access line termination circuit 210 reads out an internally held transmission condition. When an upper limit value for a concatenated data packet size has been set in the transmission condition, the multiple access line termination circuit 210 performs concatenating for only a concatenated data packet size 430 that does not exceed the upper limit value, adds a concatenated transmission overhead 530 to the concatenated transmission data packet 510 and transmits a resultant packet to the master station 10 through the multiple access line network 60.

For example, assuming that the upper limit to the concatenated data packet size is 1100 bytes and the variable speed data transmission buffer 240 holds a total of five uplink transmission data packets: P1=100 bytes, P2=200 bytes, P3=300 bytes, P4=400 bytes and P5=500 bytes, uplink transmission data packets P1 to P4 are concatenated, and the multiple access line termination circuit 210 generates a 1000-byte concatenated transmission data packet 510.

Third Embodiment

Next, a third embodiment of the present invention will be described with reference to FIG. 1, FIG. 2 and FIG. 5.

Figure 5:
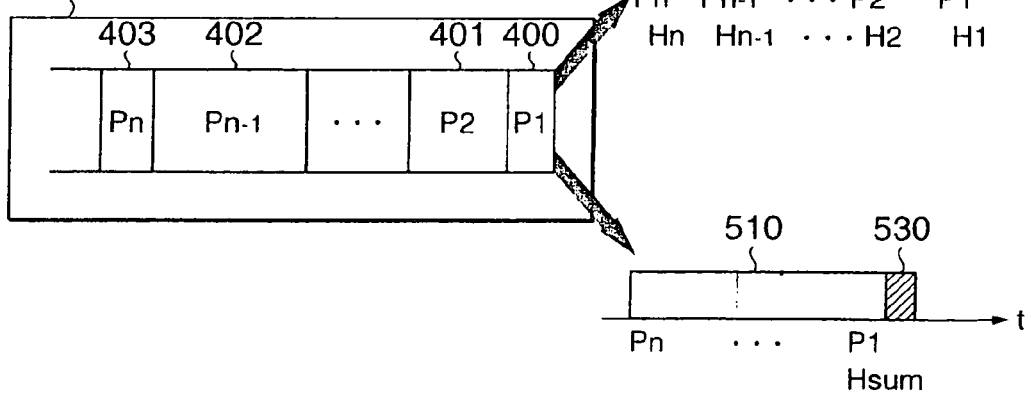
FIG. 5 is a diagram showing an example of the format of an uplink transmission data packet of the third embodiment of the present invention.

FIG. 5 is an example of the format of an uplink transmission data packet of this third embodiment. When uplink transmission data packets 400, 401, 402 and 403 shown as P1, P2, . . . Pn-1, Pn are held in the variable speed data transmission buffer 240, the multiple access line termination circuit 210 reads out a transmission condition for packet concatenation. Processing is set for the case where a concatenated transmission overhead size meeting the transmission condition is smaller than the total size of individual transmission overheads.

In the case of individual transmission, transmission overheads 520, 521, 522 and 523 shown as H1, H2 . . . Hn are individually added to uplink transmission data packets 400, 401, 402 and 403 and are transmitted. Also, in the case of concatenated transmission, the uplink transmission data packets 400, 401, 402 and 403 are transmitted as a concatenated transmission data packet 510 having a concatenated transmission overhead 530 added thereto. Here, a sum Hsum of the sizes of the overheads H1, H2 . . . Hn at the time of each individual transmission is compared with the size of the concatenated transmission overhead 530. The concatenated transmission is only carried out when the size of the concatenated transmission time overhead 530 is smaller than the sum Hsum of the sizes of the individual transmission overheads.

For example, it is assumed that a 10-byte overhead is added if uplink data packets are sent individually using the multiple access line network 60 and that a 15-byte overhead is added if transmitting a concatenated data packet. With this embodiment when a 500-byte uplink data packet A and a 100-byte uplink data packet B are held in the variable speed data transmission buffer 240, with individual transmission an uplink data packet of a total of 620 bytes, that of two uplink data packets of 510 bytes and 110 bytes, each having a 10-byte overhead added, is generated. On the other hand, with concatenated transmission, a data packet having a total of 615 byes, that of the 600-byte concatenated transmission data packet with a 15-byte overhead added, is generated. Accordingly, since the method of concatenated transmission has a smaller overhead size compared to the individual transmission, transmission data A and B are concatenated and transmitted.

Fourth Embodiment

Next, a fourth embodiment of the present invention will be described with reference to FIG. 1, FIG. 6 and FIG. 7.

Figure 6:
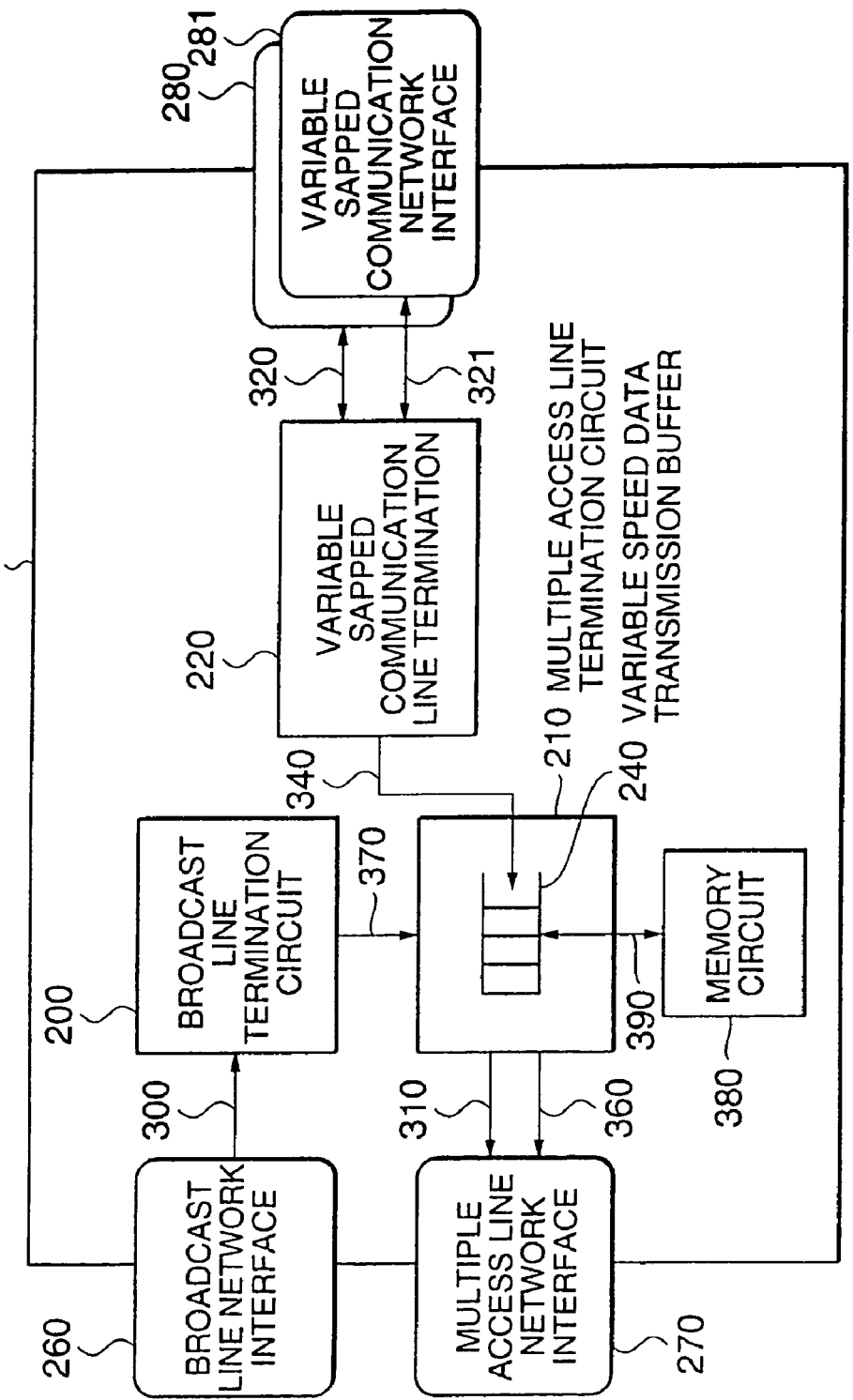
FIG. 6 is a block diagram of a slave station of fourth and fifth embodiments of the present invention.

FIG. 6 shows the structure of a slave station 20 according to the fourth embodiment. In this embodiment, a memory circuit 380 holds an overhead size correspondence table. Here, a transmission condition for packet concatenation is set such that, when an overhead size for concatenated transmission is smaller than the total size of overheads for individual transmission, the multiple access line termination circuit 210 concatenates transmission data packets.

FIG. 7 shows an example of the overhead size correspondence table being stored in the memory circuit 380 of the slave station 20 as shown in FIG. 6. The multiple access line termination circuit 210 inside the slave station 20 notifies a data packet size to the memory circuit 380 using the control signal 390 when transmitting a plurality of uplink transmission data packets being held in the variable speed data transmission buffer 240. In response to the data packet size, the memory circuit 380 searches the individual transmission overhead size correspondence table 600 (FIG. 7) for a corresponding overhead size and outputs the found overhead size back to the multiple access line termination circuit 210 via the control signal 390. The multiple access line termination circuit 210 compares the total overhead size calculated from the overhead sizes found in the table 600 with a concatenated transmission overhead that is calculated separately, and performs concatenated transmission only if the overhead size is smaller for the concatenated transmission than for the individual transmission.

Fifth Embodiment

Next, a fifth embodiment of the present invention will be described with reference to FIG. 1, FIG. 6 and FIG. 8.

FIG. 8 shows an example of an overhead size correspondence table held in the memory circuit 380 of the slave station 20 as shown in FIG. 7. The multiple access line termination circuit 210 inside the slave station 20 notifies the number of data packets and the size of the data packets to the memory circuit 380 using the control signal 390 when transmitting a plurality of uplink transmission data packets being held in the variable speed data transmission buffer 240. In response to the number of data packets and the data packet size, the memory circuit 380 searches the concatenated transmission overhead size correspondence table 700 (FIG. 8) for a corresponding overhead size and outputs the found overhead size back to the multiple access line termination circuit 210 via the control signal 390. The multiple access line termination circuit 210 compares the concatenated transmission overhead size received from the memory circuit 380 with the total overhead size that is separately calculated, and performs concatenated transmission only if the overhead size is smaller for the concatenated transmission than for the individual transmission.

Sixth Embodiment

Next, a sixth embodiment of the present invention will be described with reference to FIG. 9, FIG. 10 and FIG. 11.

Figure 9:
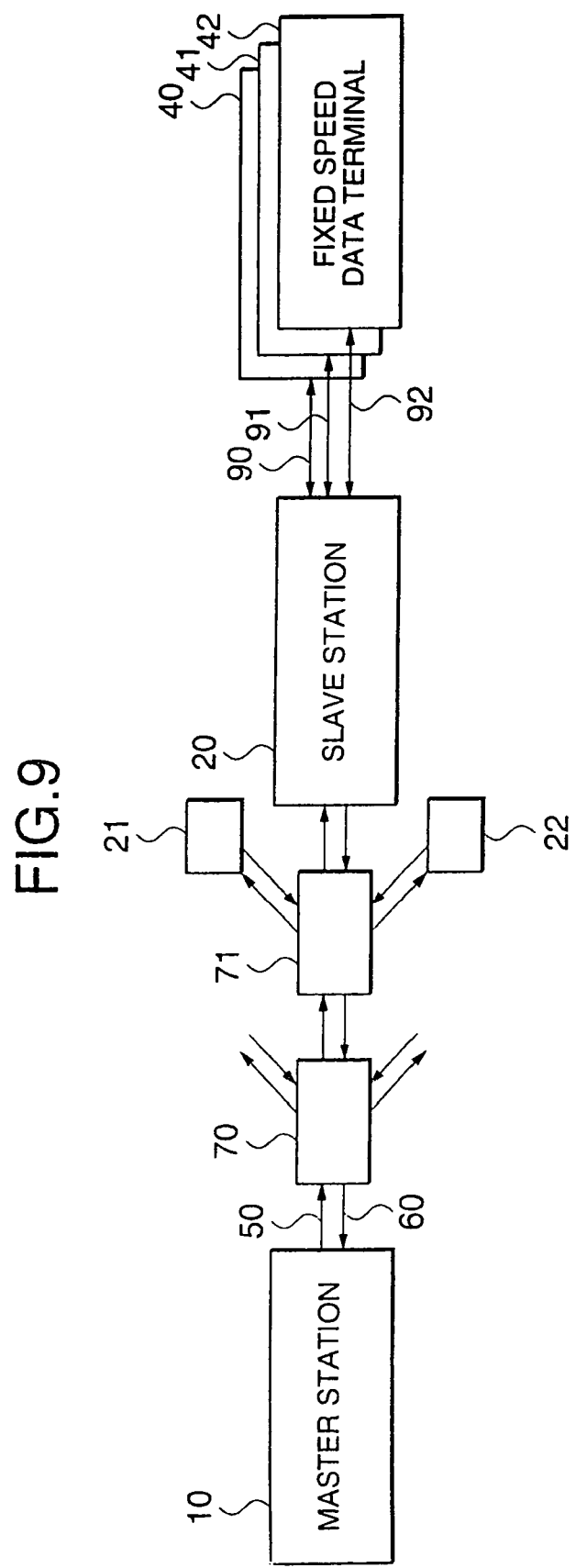
FIG. 9 is a block diagram of a multiple access communication system of the sixth, seventh and eighth embodiments of the present invention.

FIG. 9 shows a multiple access communication system of the sixth embodiment. A master station 10 and a plurality of slave stations 20, 21 and 22 are connected through distributors 70 and 71. Data and control information are sent from the master station 10 to the plurality of slave stations 21, 21 and 22 using a broadcast line 50. Data packets and control information are sent from the plurality of slave stations 20, 21 and 22 to the master station 10 using the multiple access line 60. Also, the slave station 20 is connected to respective fixed speed data terminals 40, 41 and 42 via fixed speed communication lines 90, 91 and 92.

Figure 10:
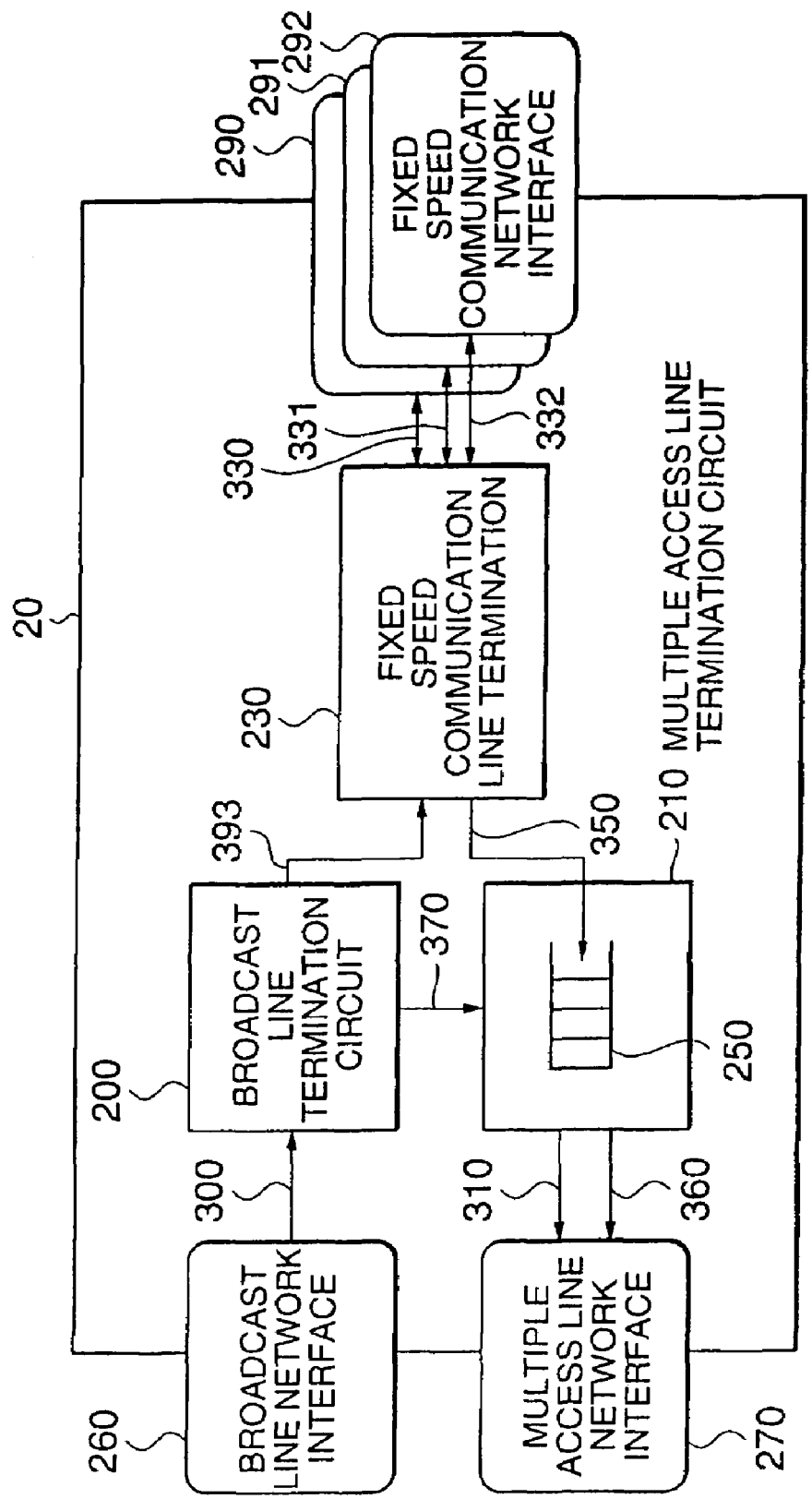
FIG. 10 is a block diagram of a slave station of the sixth embodiment of the present invention.

FIG. 10 shows the structure of the slave station 20 according to the sixth embodiment. When all of the fixed speed data terminals 40, 41 and 42 are in an active state, first of all if three fixed speed data signals 330, 331 and 332 are received, sampling is carried in the fixed speed communication line termination circuit 230 of the slave station 20, using a signal obtained by dividing a time synchronization packet 393 that is provided through the broadcast line 50 in order to obtain time synchronization of the master station 10 with the slave stations 20, 21 and 22. Then, all of the input fixed speed data signals 330, 331 and 332 are transferred to the fixed speed data transmission buffer 250 inside the multiple access line termination circuit 210 as fixed speed data packets 800, 801 and 802 (see FIG. 11). When all of the fixed speed data packets 800, 801 and 802 are accumulated in the fixed speed data transmission buffer 250, the multiple access line termination circuit 210 produces a transmission request packet 360 having its own station number and a total data size included therein, and transmits it to the master station 10 through the multiple access line network 60. The master station 10 that has received the transmission request packet 360 produces a transmission permission packet 300 having the slave station number and a data size permitted to be transmitted included therein and transmits it to the slave station 20 via the broadcast line 50. When receiving the transmission permission packet 300 at the broadcast line termination circuit 200, a transmission instruction signal 370 containing information for data permitted for transmission is transferred to the multiple access line termination circuit 210.

The multiple access line termination circuit 210 that has received the transmission instruction signal 370 extracts a plurality of transmission data packets corresponding to the designated data size from the fixed speed data transmission buffer 250, concatenates the extracted data packets and attaches an overhead such as FEC thereto. After that, the concatenated data is transmitted to the master station 10 as a transmission data signal 310 through the multiple access line 60.

Figure 11:
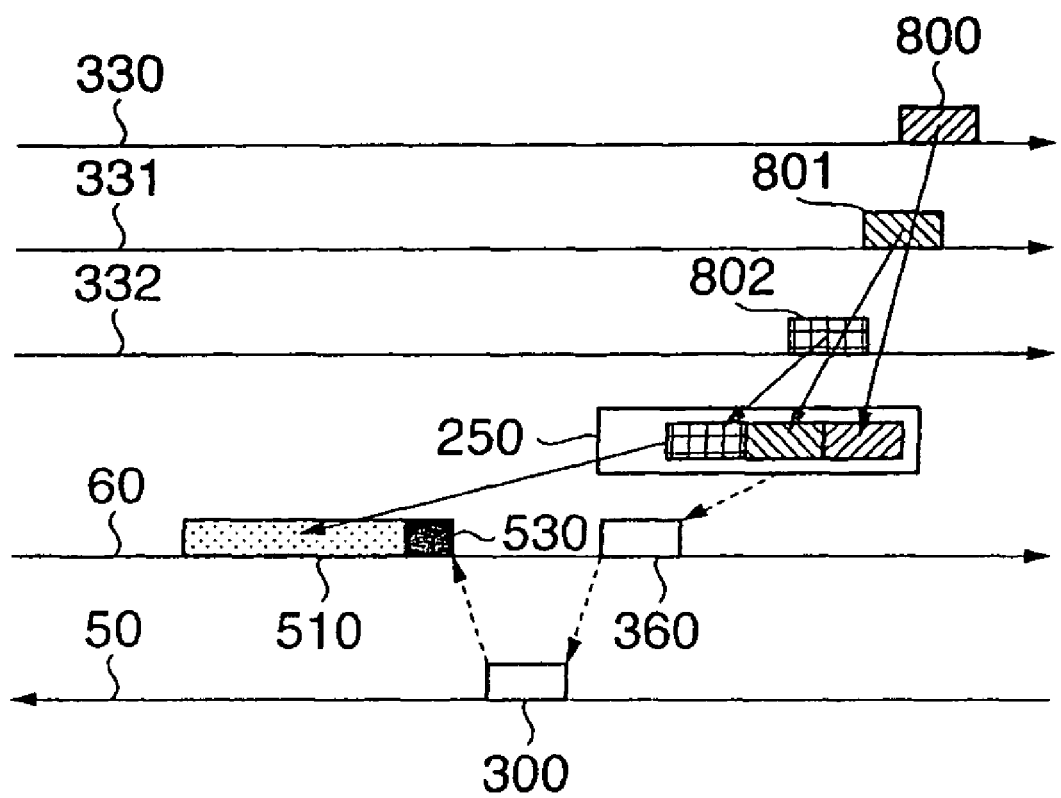
FIG. 11 is a diagram showing activity of signals at each section of the sixth embodiment of the present invention.

FIG. 11 shows processing of a signal at each section of the above described embodiment. After carrying out sampling of the fixed speed data signals 330, 331 and 332 in the fixed speed communication line termination circuit 230 of the slave station 20 using a signal divided from a time synchronization packet, respective fixed speed data packets 800, 801 and 802 are generated. The fixed speed data packets 800, 801 and 802 are sent to the fixed speed data transmission buffer 250. Upon completion of receipt of all fixed speed data packets, the multiple access line termination circuit 210 requests concatenated transmission to the master station 10 using the transmission request packet 360. The master station 10 gives permission for this concatenated transmission and notifies the slave station 20 using the transmission permission packet 300. In the event that performing concatenated transmission satisfies the transmission conditions, the multiple access line termination circuit 210 of the slave station 20 concatenates all of the fixed speed data packets 800, 801 and 802 to create a concatenated transmission data packet 510, adds to this a concatenated transmission overhead 530 and transmits a resultant packet as a transmission data signal 310 to the master station 10 through the multiple access line network 60.

Seventh Embodiment

Next, a seventh embodiment of the present invention will be described with reference to FIG. 9, FIG. 12 and FIG. 13.

Figure 12:
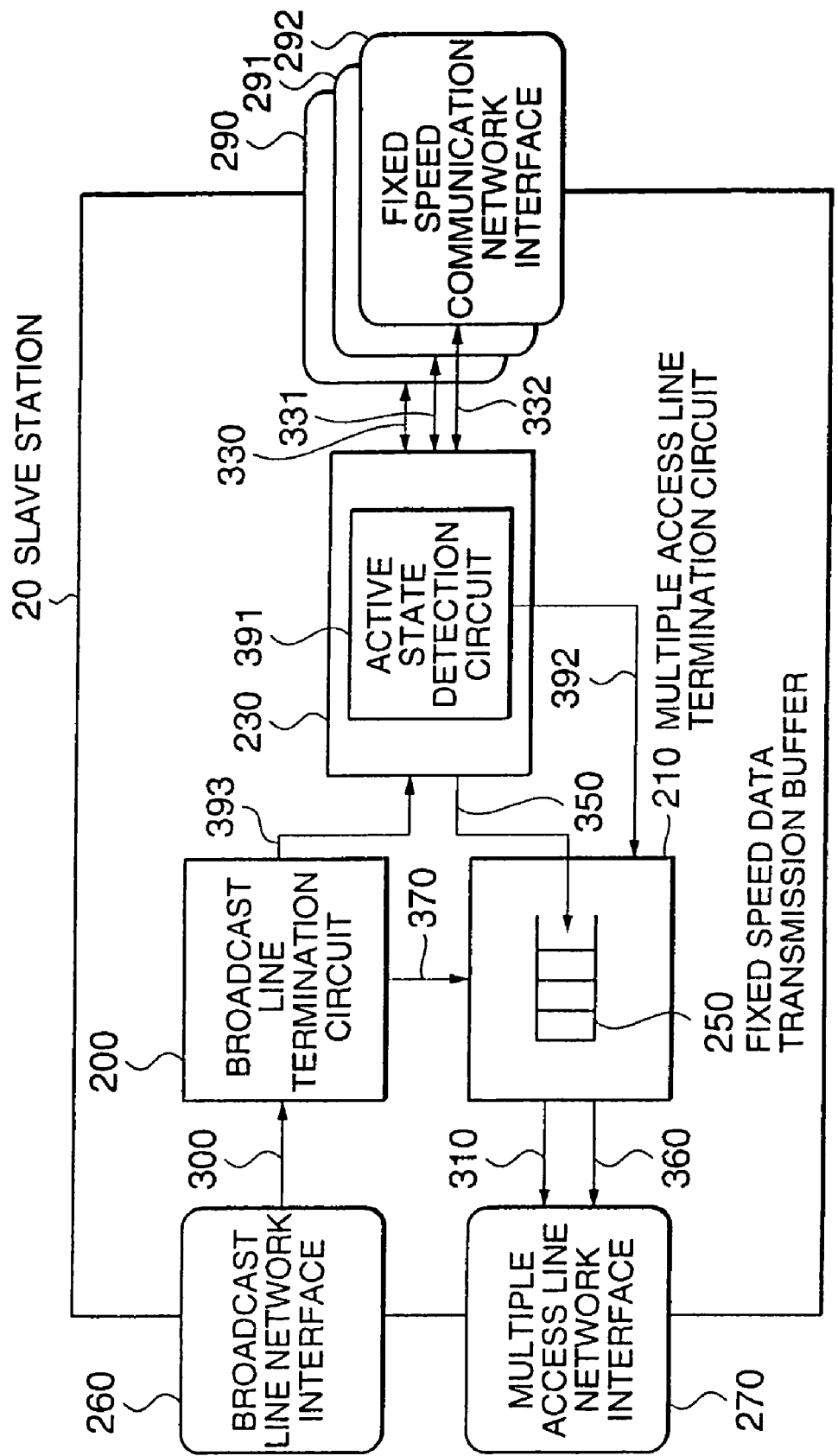
FIG. 12 is a block diagram of a slave station of the seventh embodiment of the present invention.

FIG. 12 shows a slave station of this embodiment. In FIG. 12, an active station detection circuit 391 detects whether or not the fixed speed data terminal is in an active state. FIG. 13 shows processing of a signal at each section of this seventh embodiment.

Figure 13:
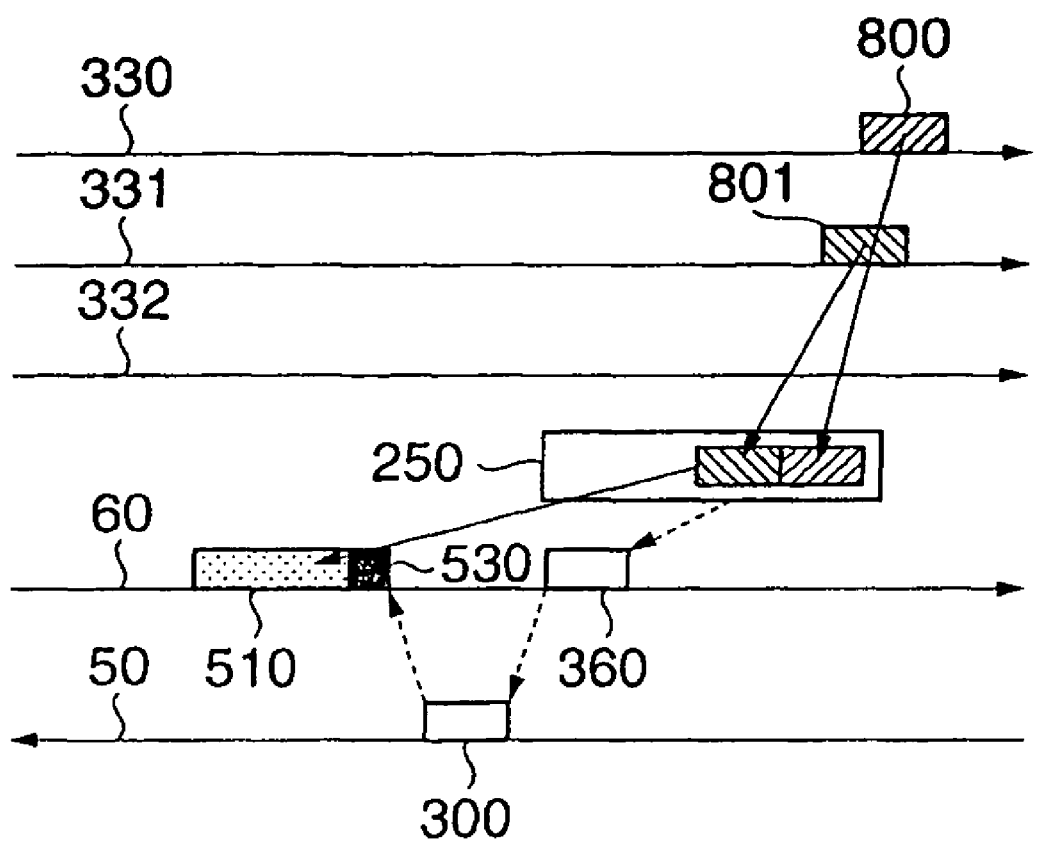
FIG. 13 is a diagram showing activity of signals at each section of the seventh embodiment of the present invention.

In FIG. 9, FIG. 12 and FIG. 13, the fixed speed communication line termination circuit 230 of the slave station 20 has the active state detection circuit 391 inside, and in the active state detection circuit 391 it is detected whether or not all fixed speed data terminals 40, 41 and 42 connected to the slave station 20 are in an active state. In the example shown in FIG. 13, two fixed speed data terminals 40 and 41 are in an active state. The number of fixed speed data terminals that are in the active state is notified to the multiple access line termination circuit 210 using an active state notification signal 392. The multiple access line termination circuit 210 receiving this notification receives the fixed speed data packets 800 and 801 from the two fixed speed data terminals 40 and 41. When concatenating and transmitting satisfies the transmission condition, concatenating and transmitting of these two data packets is requested to the master station 10 using a transmission request packet 360. When the master station 10 permits this action and notifies the slave station 20 of transmission permission using the transmission permission packet 300, the broadcast line termination circuit 200 of the slave station 20 receives the transmission permission packet 300 and transfers a transmission instruction signal to the multiple access line termination circuit 210. The two fixed speed data packets 800 and 801 are then concatenated in the multiple access line termination circuit 210, a concatenated transmission data packet 510 is made, and a concatenated transmission overhead 530 is added thereto, and then transmitted to the master station 10 as a transmission data signal 310 via the multiple access line network 60.

Eighth Embodiment

Next, an eighth embodiment of the present invention will be described with reference to FIG. 9, FIG. 14 and FIG. 15.

Figure 14:
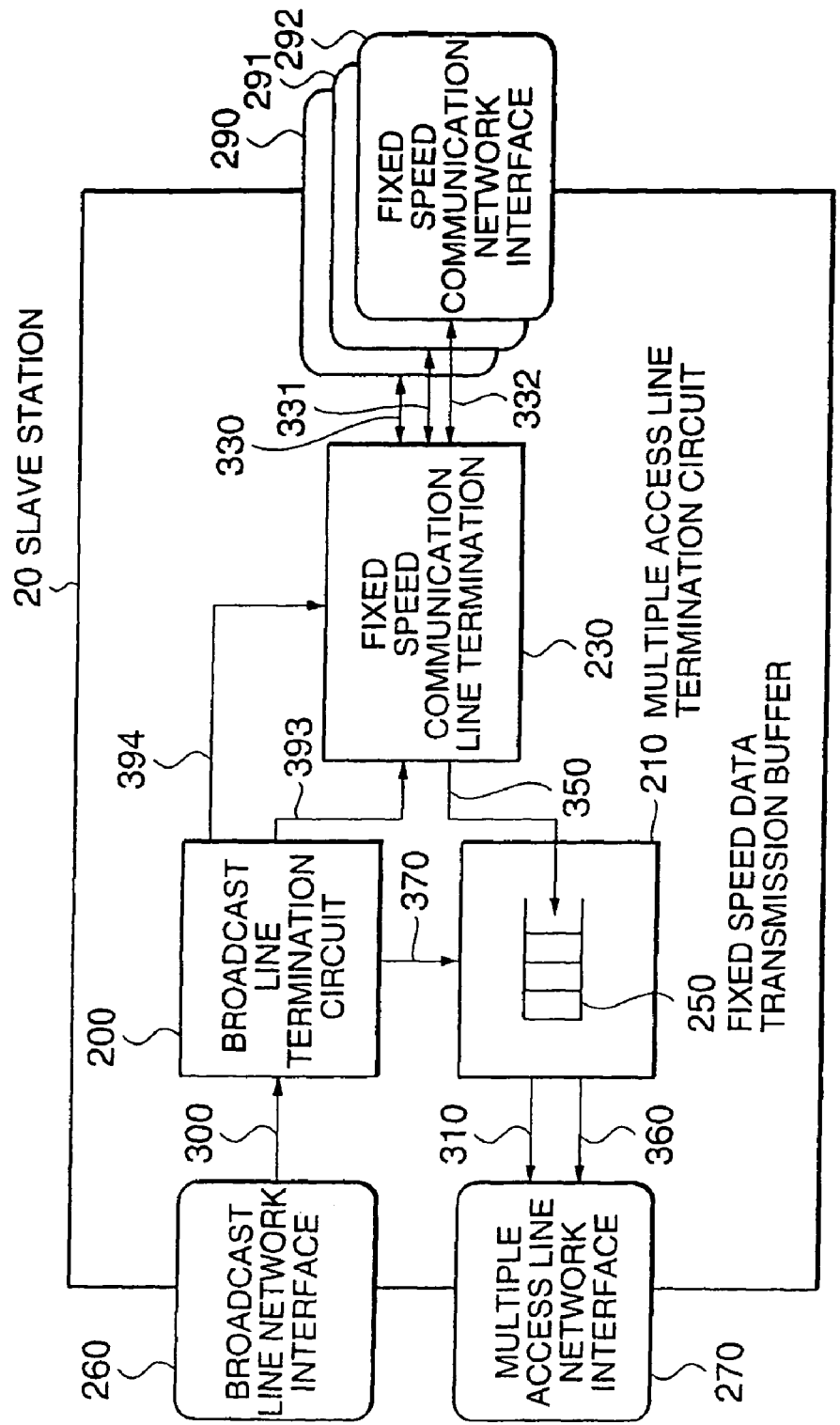
FIG. 14 is a block diagram of a slave station of the eighth embodiment of the present invention.
Figure 15:
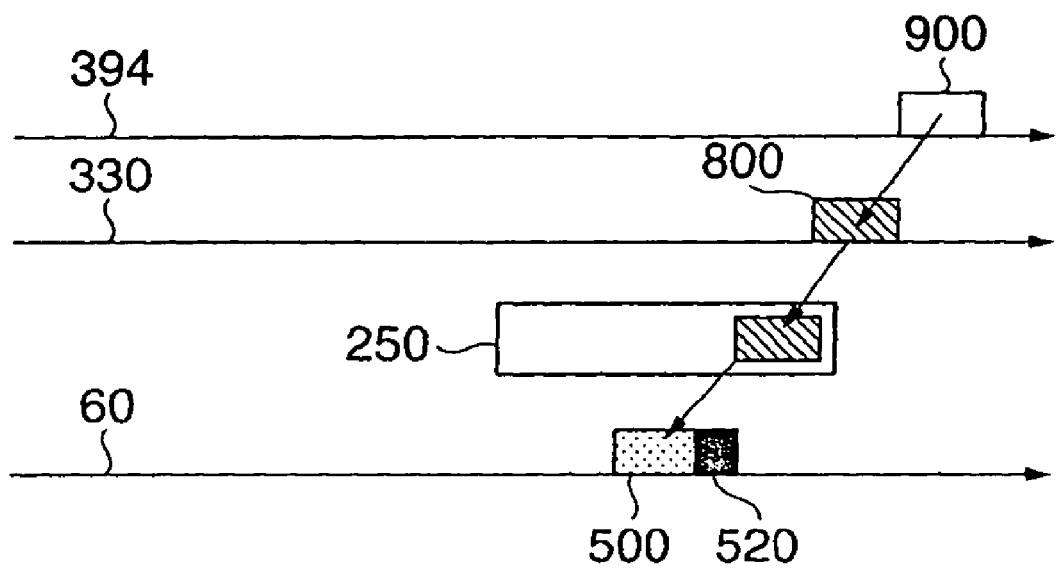
FIG. 15 is a diagram showing activity of signals at each section of the eighth embodiment of the present invention

FIG. 14 shows a slave station 20 of this eighth embodiment, while FIG. 15 is a drawing showing processing of a signal at each section of this embodiment.

In FIG. 9, FIG. 14 and FIG. 15, in the event that only the fixed speed data terminal 40 connected to the slave station 20 is in an active state, the master station 10 periodically transmits the transmission permission packet to the slave station 20. When the broadcast line termination circuit 200 receives the transmission permission packet 300 from the master station 10, a synchronization pulse 900 is sent to the fixed speed data communication line termination circuit 230 as a transmission synchronization signal 394 in compliance with transmission timing of the multiple access line termination circuit 210, and the fixed speed data communication line termination circuit 230 produces a fixed speed data packet 800 synchronized to the synchronization pulse signal 900 and sends it to the fixed speed data transmission buffer 250 within the multiple access line termination circuit 210. The multiple access line termination circuit 210 produces a transmission request packet having its own station number and a total data size included therein and transmits this transmission request packet to the master station 10 through the multiple access line 60. The master station 10 that has received the transmission request packet 360 produces a transmission permission packet 300 having the number of the slave station 20 and a data size permitted to be transmitted included therein and sends it to the slave station 20 via the broadcast circuit 50. When the broadcast line termination circuit 200 of the slave station 20 has received the transmission permission packet 300, it is transferred to the multiple access line termination circuit 210 as a transmission instruction containing data information for permitting transmission. The multiple access line termination circuit 210 adds an individual transmission overhead 520 to the fixed speed data packet 800 produced in synchronism with the aforementioned master station, and transmits a resultant packet to the master station 10 as a transmission data signal 310 via the multiple access line 60.

Ninth Embodiment

Next, a ninth embodiment of the present invention will be described with reference to FIG. 1, FIG. 16 and FIG. 17.

Figure 16:
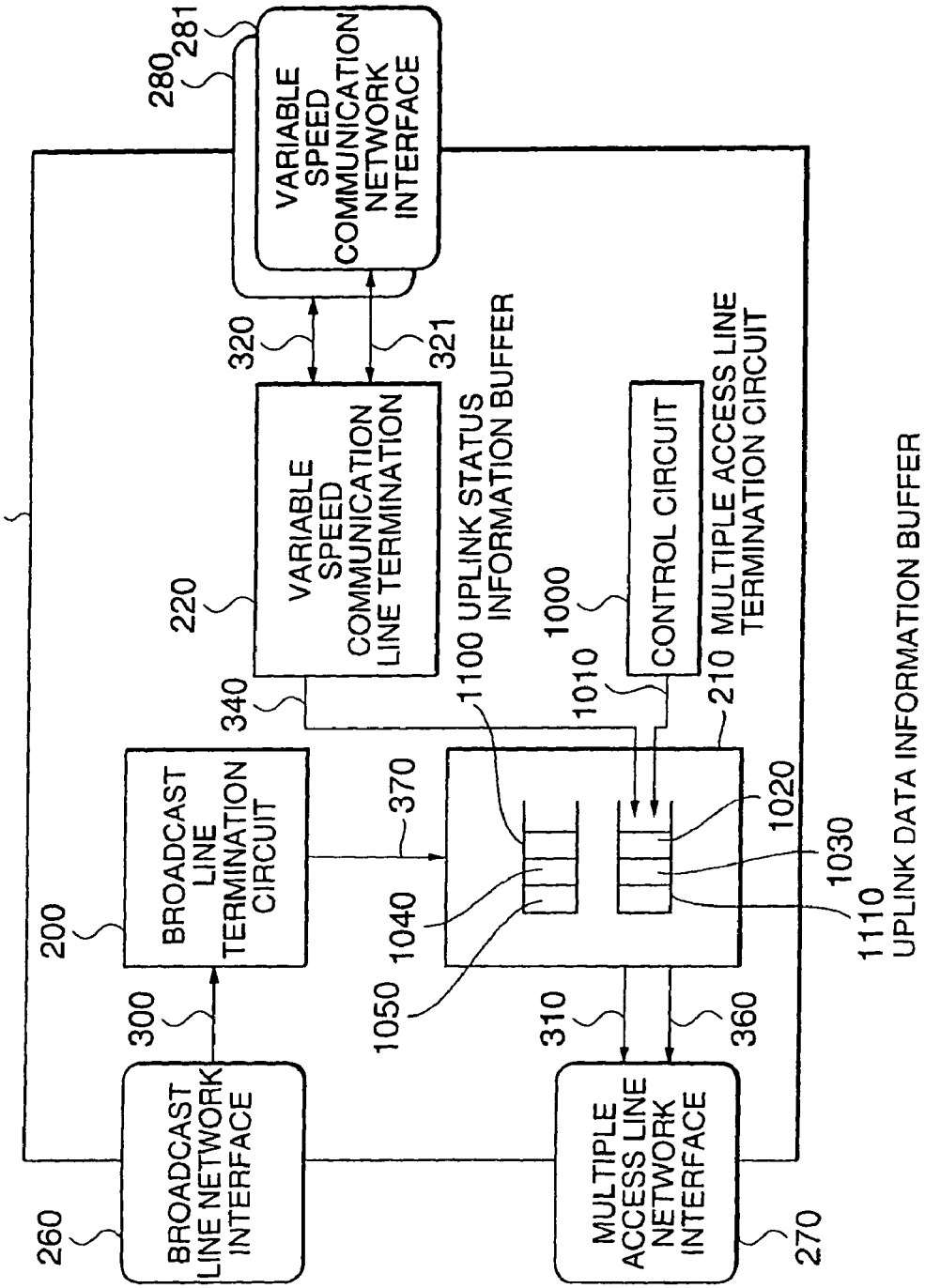
FIG. 16 is a block diagram of a slave station of the ninth and tenth embodiments of the present invention.

FIG. 16 shows a slave station of this ninth embodiment. The slave station 20 has a control circuit 1000, while the multiple access line termination circuit 210 has an uplink status information buffer 1100 and an uplink data transmission buffer 1110.

When the multiple access line termination circuit 210 has received a variable speed data packet signal 340 from the variable speed data communication line termination circuit 220, this signal is stored in the uplink data transmission buffer 1110 as uplink transmission data packet 1030. When the multiple access line termination circuit 210 has received an uplink control information packet signal 1010 from the control circuit 1000, this signal is stored as an uplink control information packet 1020 in the uplink transmission buffer 1110. In this way, when the uplink transmission data packet 1030 is stored in the uplink transmission buffer 1110, the multiple access line termination circuit 210 produces uplink transmission data packet status information 1050. Also, when an uplink control information packet 1020 is stored in the uplink data transmission buffer 1110, the multiple access line termination circuit 210 produces uplink control information packet status information 1040. The uplink transmission data packet status-information 1050 and uplink control information packet status information 1040 are held in the uplink status information buffer 1100. The respective uplink transmission data packet status information 1050 and uplink control information packet status information 1040 have control flags therein. Either not-changeable or changeable is set in each control flag, and the number of uplink transmission data packets that can be set to not-changeable has an upper limit value.

Figure 17:
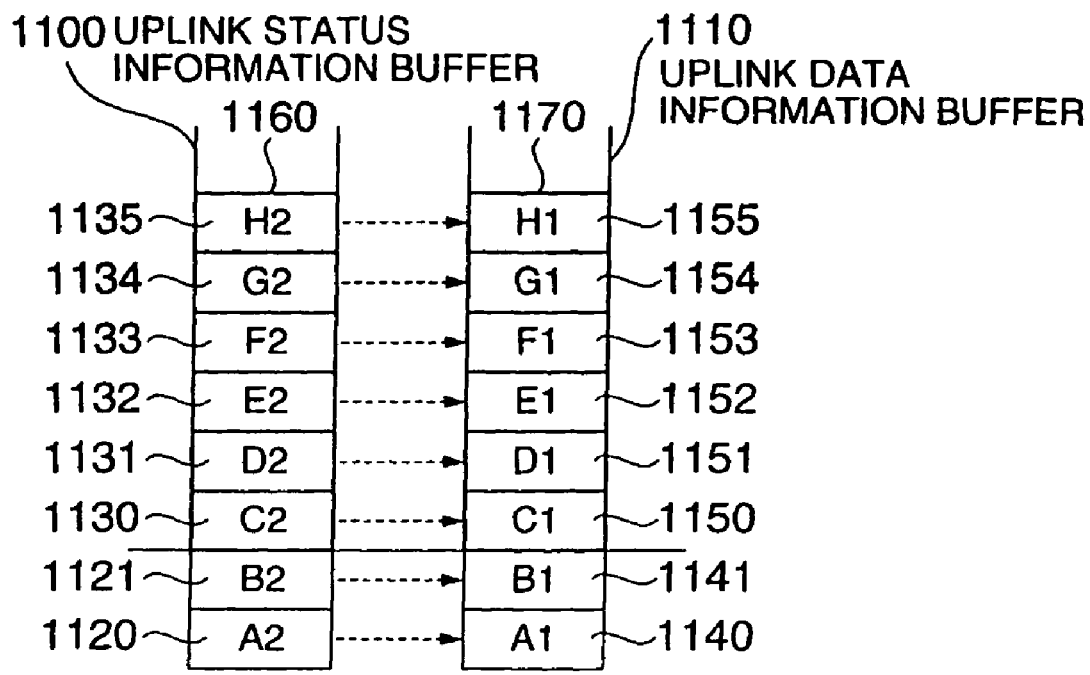
FIG. 17 is a block diagram showing details of the buffer inside the multiple access line termination circuit of the ninth embodiment of the present invention in FIG. 16.

FIG. 17 shows the detailed structure of the uplink status information buffer 1100 and the uplink data transmission buffer 1110.

It is assumed that the upper limit value for the number of data packets that can be stored in each of the uplink status information buffer 1100 and the uplink data transmission buffer 1110 is made to be 2. In FIG. 17, reference numerals 1140, 1141, and 1150 to 1155, denote uplink transmission data packets. Reference numerals 1120, 1121 and 1130 to 1135 denote uplink transmission data packet status information corresponding to the uplink transmission data packets 1140, 1141 and 1150 to 1155. Control flags of the uplink transmission data packet status information 1120 and 1121 are not changeable. Control flags of the uplink transmission data packet status information 1130 and 1135 are changeable.

It is assumed that the uplink data transmission buffer 1110 is empty. The two uplink transmission data packets 1140 and 1141 are respectively held at A1 and B1 in the uplink data transmission buffer 1110. At this time, the multiple access line termination circuit 210 produces two uplink transmission data packet status information 1120 and 1121 corresponding respectively to the uplink transmission data packets 1140 and 1141. Control flags of the uplink transmission data status information 1120 and 1121 are set to be not-changeable. At this time, the multiple access line termination circuit 210 respectively holds the uplink transmission data packet status information 1120 and 1121 at A2 and B2 in the uplink status information buffer 1100. In the case where the slave station 20 has received more uplink transmission data packets, the multiple access line termination circuit 210 holds uplink transmission data packets 1150 to 1155 at C1 to H1 in the uplink transmission data buffer 1110. At this time, the multiple access line termination circuit 210 produces uplink transmission data packet status information 1130 to 1135 respectively corresponding to the uplink transmission data packets 1150 to 1155. Control flags of the uplink transmission data packet status information 1130 to 1135 are set to be changeable. These uplink transmission data packet status information 1130 to 1135 are respectively held at C2 to H2 in the uplink status information buffer 1100.

In the above described status denoted by "S", the slave station 20 transmits the transmission request packet 360 to the master station 10. The master station 10 receives this transmission request packet 360 and transmits a transmission permission packet 300 to the slave station. When the slave station 20 receives permission for transmission, the multiple access line termination circuit 210 extracts the uplink transmission data packet 1140 from A1 in the uplink transmission data packet buffer 1110. The multiple access line termination circuit 210 adds a transmission request packet for transmitting the next uplink transmission data packet 1141 to the uplink transmission data packet 1140, and transmits it to the master station. At this time, the multiple access line termination circuit 210 deletes the uplink transmission data packet status information A2 from the uplink status information buffer 1100. This causes the number of not-changeable uplink transmission data status information to be lower than the upper limit value to the number of data packets that can be stored in each of the uplink status information buffer 1100 and the uplink data transmission buffer 1110.

Subsequently, the transmission condition stored in the multiple access line termination circuit 210 are referenced. If concatenating and transmitting of all uplink transmission data packets 1150 to 1155 having a changeable control flag satisfies the transmission condition, then the multiple access line termination circuit 210 performs concatenating processing, and changes control flags of all uplink transmission data packet status information 1130 to 1135 having changeable control flags corresponding to these uplink transmission data packets 1150 to 1155 to not-changeable.

Tenth Embodiment

Next, a tenth embodiment of the present invention will be described with reference to FIG. 1, FIG. 16 and FIG. 18.

Figure 18:
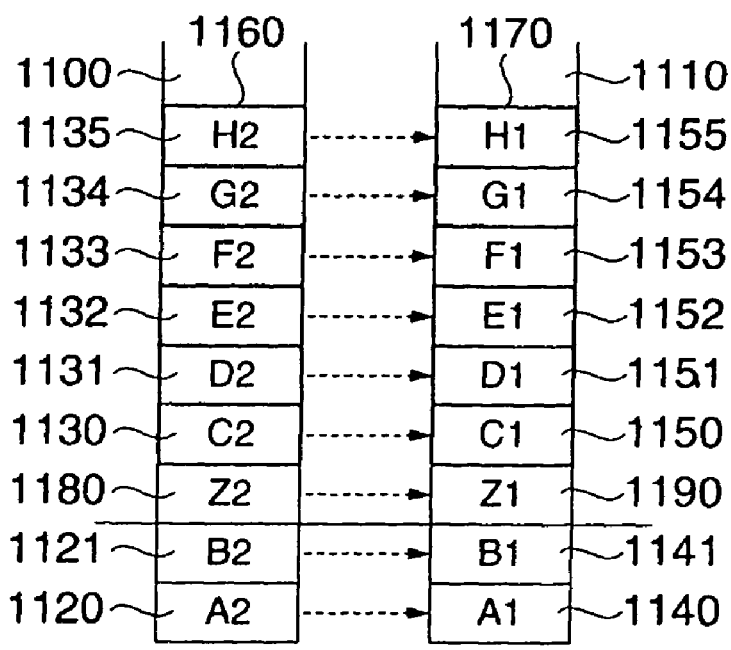
FIG. 18 is a block diagram showing details of the buffer inside the multiple access line termination circuit of the tenth embodiment of the present invention in FIG. 16.

FIG. 18 shows the detailed structure of the uplink status information buffer 1100 and the uplink data transmission buffer 1110. Similarly to the ninth embodiment, an upper limit to the number of data packets that can be stored in the uplink status information buffer 1100 and the uplink transmission data packet buffer 1110 is made 2. Reference numeral 1190 indicates an uplink control information packet, and reference numeral 1180 indicates uplink control information packet status information corresponding to uplink control information packet Z2.

At the time of the previously described status S, the multiple access line termination circuit 210 inserts the uplink control information packet 1190 into Z1 immediately before C1 to H1. Next, the multiple access line termination circuit 210 produces uplink control information packet status information 1180 from the uplink control information packet 1190. The multiple access line termination circuit 210 then inserts the uplink control information packet status information 1180 into Z2 immediately before C2 to H2. In this manner, the uplink control information packet 1190 can be transmitted with taking precedence over user data packets.

The ten embodiments of the present invention have been described above, but the present invention is not limited to these embodiments, and various modifications are possible within the scope of the present invention. For example, in all of these embodiments, the master station and the slave stations are connected by a wired network, but it is also possible to apply the present invention to the case where they are connected using a wireless network.

As has been described above, according to the present invention, the size of overheads to be added is compared between concatenated transmission and individual transmission, and concatenated transmission is performed only if the size of the overhead for the concatenated transmission case is smaller than for the individual transmission case. This has the effect of always being able to achieve improvement in the transmission efficiency of a multiple access line network.

Also, when concatenating a plurality of packets for transmission, a transmission condition for packet concatenation is referred to and a plurality of packets is concatenated and transmitted only when a transmission condition for packet concatenation is satisfied. Accordingly, it is possible to prevent a slave station from transmitting a large amount of concatenated packet data over a long period of time, which means that in a multiple access line network, the effect is obtained of preventing a single base station being active over a prolonged period of time and occupying the uplink.

Further, it is possible for a slave station to periodically transmit data packets due to the master station periodically sending a transmission permission packet and the slave station produces fixed speed data packets in synchronism with timing at which data packet transmission is permitted. Accordingly, it is possible to shorten the waiting time for a transmission buffer within the slave station, and thus obtain the effect of making it possible to reduce a delay time for fixed speed data required in real time, such as a telephone.

Further, in a state where a control flag in uplink transmission data packet status information produced when storing uplink transmission data packets in the transmission buffer is set to changeable, the uplink transmission data packet status information is held in the uplink status information buffer. Accordingly, the effect is obtained of enabling concatenating of a plurality of uplink transmission data packets even in the case where uplink transmission data packets in the transmission buffer are automatically transmitted.

Also, since an uplink control information is inserted into immediately before all uplink user data having the control flag set to changeable in the transmission buffer, the effect is obtained of making it possible to prioritize transmission of uplink control information compared to the uplink user data.

What is claimed is:

1. A multiple access communications system comprising:
   a master station; and
   a plurality of slave stations, each of which is connected to the master station using a multiple access controlled uplink and a broadcasting downlink and is connected to at least one terminal, wherein each of the slave stations transmits an uplink data packet and an uplink control information packet to the master station as an uplink transmission data packet,
   wherein each of the slave stations comprise:
      a first buffer for storing uplink transmission data packets;
      a second buffer for storing uplink transmission data packet status information indicating a status of each of the uplink transmission data packets; and
      a buffer controller controlling such that, when an uplink transmission data packet is stored in the first buffer, a control flag is set to not-changeable and is added to uplink transmission data packet status information corresponding to the uplink transmission data packet, and the uplink transmission data packet status information with the control flag set to not-changeable is stored in the second buffer.

2. The multiple access communication system according to claim 1, wherein the buffer controller previously sets an upper limit to a number of uplink transmission data packets to be set to not-changeable, wherein, when a number of uplink transmission data packets exceeds the upper limit, the buffer controller sets the control flag to changeable and adds it to uplink transmission data packet status information corresponding to uplink transmission data packets exceeding the upper limit, to store the uplink transmission data packet status information with the control flag set to changeable in the second buffer.

3. The multiple access communication system according to claim 1, wherein each of the slave stations further comprises a condition memory storing a transmission condition for packet concatenation, wherein, when a number of uplink transmission data packets set to not-changeable falls below the upper limit, the buffer controller determines whether the uplink transmission data packets set to changeable stored in the first buffer satisfy the transmission condition, and when the uplink transmission data packets set to changeable satisfy the transmission condition, the buffer controller sets a control flag of uplink transmission data packet status information corresponding to each of the uplink transmission data packets set to changeable to not-changeable, and concatenates the uplink transmission data packets set to changeable in sequence to produce a concatenated uplink transmission packet for transmission to the master station.

4. The multiple access communication system according to claim 1, wherein the buffer controller controls such that, when the uplink control information packet is stored in the first buffer, the uplink control information packet is stored at a location of the first buffer immediately before the uplink transmission data packets set to not-changeable stored in the first buffer.

5. A data transceiver connected between a master station and at least one terminal to transfer data between the master station and the at least one terminal, comprising:

a first buffer for storing uplink transmission data packets;

a second buffer for storing uplink transmission data packet status information indicating a status of each of the uplink transmission data packets; and a buffer controller controlling such that, when an uplink transmission data packet is stored in the first buffer, a control flag is set to not-changeable and is added to uplink transmission data packet status information corresponding to the uplink transmission data packet, and the uplink transmission data packet status information with the control flag set to not-changeable is stored in the second buffer.

6. A method for transferring data between a master station and at least one terminal, comprising the steps of:

storing uplink transmission data packets in a first buffer;

storing uplink transmission data packet status information indicating a status of each of the uplink transmission data packets in a second buffer;

when an uplink transmission data packet is stored in the first buffer, setting a control flag to not-changeable and adding it to uplink transmission data packet status information corresponding to the uplink transmission data packet; and storing the uplink transmission data packet status information with the control flag set to not-changeable in the second buffer.

* * * * *